Patented Apr. 2, 1935

1,996,088

UNITED STATES PATENT OFFICE 1,996,088

RECOVERY OF ACETYLENE FROM GASES

Guy B. Taylor, Wilmington, Del., assignor to E. I. du Pont de Nemours & Company, Wilmington, Del., a corporation of Delaware No Drawing. Application July 21, 1933, Serial No. 681,557

6 Claims. (Cl. 260—170)

This invention relates to a process of removing acetylene from gases and, more particularly, relates to a process wherein gases containing acetylene are scrubbed with a liquid comprising an organic compound adapted to dissolve the acetylene.

In producing acetylene by cracking hydrocarbons, the acetylene is necessarily mixed with other gases, largely hydrogen, and the recovery of acetylene from such gases presents a problem of importance to the industry. The recovery of acetylene from gases heretofore has been accomplished by scrubbing said gases with a liquid comprising a variety of compounds adapted to dissolve the acetylene. Although compounds heretofore suggested will accomplish this purpose, they are by no means ideal for the purpose and leave considerable room for improvement.

In United States Patent 1,854,141, to G. F. Horsley, "Removal of acetylene from gases", a number of compounds adapted for dissolving acetylene are disclosed. Also in that patent are disclosed five properties necessary in an ideal solvent for the purpose of recovering acetylene from gases. These properties are: (1) High solubility for acetylene with low solubility for other gases; (2) high boiling point and low vapor pressure at ordinary temperatures; (3) low viscosity in order to ensure efficient wetting of the packing in an absorption tower; (4) stability at the boiling point; (5) no chemical reaction with acetylene or other gases such as methane or olefines, etc. A sixth obviously desirable requirement is that the solvent be cheap.

An object of the present invention is to provide compounds better suited than those heretofore known for the purpose of recovering acetylene from gases. A further object is to provide cheaper compounds. A still further and particular object is to provide compounds of exceptionally low vapor pressure, as usually the unavoidable losses in solvent are determined solely by the vapor pressure of the solvent employed. Other objects will be apparent from the description of the invention given hereinafter.

The above objects are accomplished according to the present invention by scrubbing gases containing acetylene with a liquid comprising an ester of an aliphatic polybasic acid and a monohydric alcohol having 1–3 carbon atoms, inclusive. More particularly the invention comprises scrubbing gases containing acetylene with a liquid comprising an ester of an aliphatic dibasic acid and ethyl alcohol, especially diethyl oxalate.

Of the aliphatic polybasic acids suitable for forming the esters coming within the scope of the present invention may be mentioned: oxalic, malonic, succinic, adipic, sebacic, citric, malic, maleic, tartaric, tricarballylic, dilactylic, thiodilactylic, itaconic, and pimelic.

Polybasic acid esters of the following alcohols fall within the scope of the invention: Methyl, ethyl, propyl, isopropyl, vinyl, and allyl. The saturated esters are preferred since they are less inclined to polymerize and are more inert toward acetylene.

While an ester which is solid at ordinary temperatures cannot be used per se for scrubbing gases, such esters may be mixed with other esters which are liquids to give a suitable liquid solvent. For example, dimethyl oxalate is a solid melting at 54° C., but a liquid may be formed containing 50% each of diethyl and dimethyl oxalate and this liquid can be used satisfactorily for scrubbing gases.

The class of esters herein considered possess the five properties above set forth as desirable in a solvent for recovering acetylene from gases, low vapor pressure being a characteristic of the class.

The most suitable ester as yet found for the purpose of this invention is diethyl oxalate. This ester dissolves 15 volumes of acetylene at 15° C., 12 volumes at 20° C., and about 9 volumes at 40° C. The solubility follows Henry's law at any fixed temperature. The solubility of most of the gases commonly found in admixture with acetylene, such as air, methane, hydrogen, carbon monoxide, and the like, is quite low. Although carbon dioxide and ethylene are appreciably soluble in diethyl oxalate it does not mitigate against the desirability of this solvent where such gases are present in small amounts.

In order to illustrate the selective solution of acetylene from mixed gases by diethyl oxalate, mixed gases of varying composition were bubbled through diethyl oxalate until the ester was saturated. The dissolved gas was then driven out by heating the solvent and analyzed. The following table shows the results thus obtained:

| Original gas mixture | Gas driven out of solvent |
| --- | --- |
| $C_2H_2$ 76.4%, $C_2H_4$ 21.1% | 91.6% $C_2H_2$ |
| $C_2H_2$ 33%, $C_2H_4$ 14%, City gas 53% | 80.4% $C_2H_2$ |
| $C_2H_2$ 75%, natural gas 25% | 93.3% $C_2H_2$ |

The natural gas consisted essentially of saturated hydrocarbons of the methane series having the general formula $C_nH_{2n+2}$, wherein $n$ has an average value of 1.26.

Tests indicate that increases of molecular weight for a series of homologous compounds lower the acetylene solubility, and losses of the solvent in recovering acetylene are substantially a function of the product of the molecular weight of the solvent and the vapor pressure thereof, the cost of these losses being a function of the product of the molecular weight, vapor pressure, and price per unit weight of the solvent. It will be seen in view of these considerations that diethyl oxalate is exceptionally suitable for the purposes of the present invention. It has a high solubility for acetylene at room temperature, it is not viscous, and its vapor pressure at room temperature is low, considerably lower than would be inferred from a casual inspection of its boiling point, and sufficiently low to avoid serious losses in use. Furthermore, this solvent is relatively cheap, stable at its boiling point, and does not react chemically with acetylene or other gases, such as methane or olefines, under the normal conditions of use in the process according to the present invention.

Particularly suitable ethyl esters of dibasic acids for use in the present invention are given below with their molecular weight and solubility for acetylene. The solubility is given in volumes of acetylene per volume of solvent at 20° C.:

|  | Mol. weight | Solubility $C_2H_2$ |
|---|---|---|
| Diethyl oxalate | 146 | 12 |
| Diethyl malonate | 160 | 11 |
| Diethyl succinate | 174 | 11 |
| Diethyl fumarate | 212 | 9 |
| Diethyl tartrate | 206 | 6 |

Although the present invention has been described with particular reference to the recovery of acetylene from a gaseous mixture obtained by cracking hydrocarbons, it will be apparent to those skilled in the art that the invention is broadly applicable to the recovery of acetylene from acetylene containing gases in general and not limited to such gases produced by cracking hydrocarbons.

As many apparently widely different embodiments of this invention may be made without departing from the spirit and scope thereof, it is to be understood that the invention is not limited to the specific embodiments thereof except as defined in the appended claims.

I claim:

1. Process of recovering acetylene from gases containing same which includes the step of scrubbing said gases with a liquid predominantly comprising an ester of an aliphatic polybasic acid and a monohydric alcohol having 1–3 carbon atoms, inclusive.

2. Process of recovering acetylene from gases containing same which includes the step of scrubbing said gases with a liquid predominatly comprising an ester of an aliphatic dibasic acid and a monohydric alcohol having 1–3 carbon atoms, inclusive.

3. Process of recovering acetylene from gases containing same which includes the step of scrubbing said gases with a liquid predominantly comprising an ester of an aliphatic polybasic acid and ethyl alcohol.

4. Process of recovering acetylene from gases containing same which includes the step of scrubbing said gases with a liquid predominantly comprising an ester of oxalic acid and a monohydric alcohol having 1–3 carbon atoms, inclusive.

5. Process of recovering acetylene from gases containing same which includes the step of scrubbing said gases with a liquid predominantly comprising an ester of an aliphatic dibasic acid and ethyl alcohol.

6. Process of recovering acetylene from gases containing same which includes the step of scrubbing said gases with a liquid predominantly comprising diethyl oxalate.

GUY B. TAYLOR.